H. C. HUNN.
CLUTCH SPRING COMPRESSOR.
APPLICATION FILED MAR. 30, 1920.
1,372,350.
Patented Mar. 22, 1921.
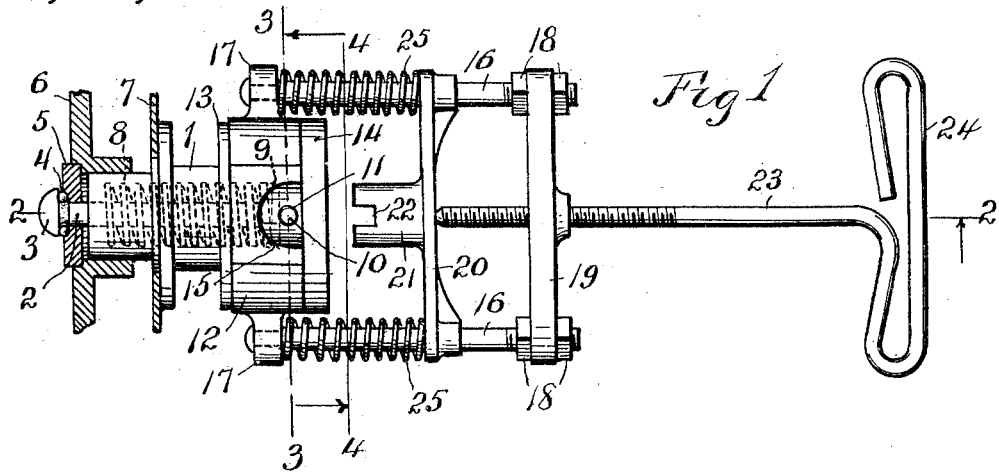
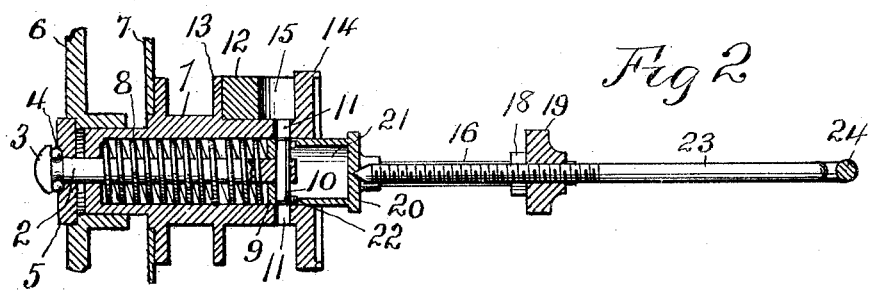
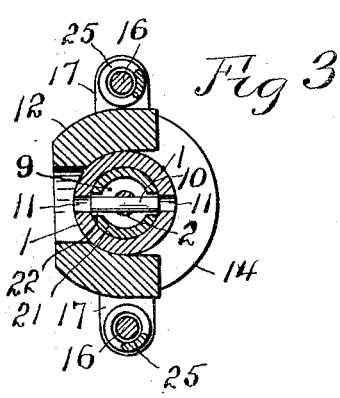
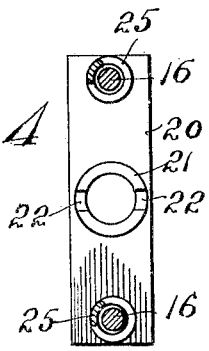
Witness:
R. E. Hamilton
Inventor,
Herman C. Hunn,
By Warren D. House,
His Attorney.

UNITED STATES PATENT OFFICE.

HERMAN C. HUNN, OF OSAGE CITY, KANSAS.

CLUTCH-SPRING COMPRESSOR.

1,372,350.    Specification of Letters Patent.    Patented Mar. 22, 1921.

Application filed March 30, 1920. Serial No. 369,987.

*To all whom it may concern:*

Be it known that I, HERMAN C. HUNN, a citizen of the United States, residing at Osage City, in the county of Osage and State of Kansas, have invented a certain new and useful Improvement in Clutch-Spring Compressors, of which the following is a specification.

My invention relates to improvements in clutch spring compressors. It is particularly well adapted for use in connection with certain types of automobile clutches, such, for instance as a clutch employed on the "Chevrolet" machine.

The object of my invention is to provide a novel tool which may be quickly and easily applied to a clutch hub for the purpose of compressing a spring carried therein, so that a pin which supports the spring may be easily inserted into or removed from its operative position in the hub, the tool being arranged to force the spring from its bearing on the pin, so that the pin can be removed, or to compress the spring to a point which will permit the insertion of the pin into its operative position.

A further object of my invention is to provide a tool of the kind described which is simple, cheap to make, durable, not liable to get out of order, which is easy to apply and to remove, and which is efficient in operation.

My improved tool is principally adapted for use by those who assemble and disassemble clutches of the kind referred to, in the construction or repairing of the same.

The novel features of my invention are hereinafter fully described and claimed.

In the accompanying drawings which illustrate the preferred form of my invention, as applied to a clutch of a "Chevrolet" automobile.

Figure 1 is a plan view of my improved compressor shown mounted on a clutch hub and disengaged from the spring which operates the clutch.

Fig. 2 is a vertical sectional view on the plane of the line 2—2 of Fig. 1, the spring being shown bearing against the pin, with the compressing member of the tool in operative position for compressing the spring sufficiently to release the pin.

Fig. 3 is a cross section on the line 3—3 of Fig. 1.

Fig. 4 is a cross section on the line 4—4 of Fig. 1.

Similar reference characters designate similar parts in the different views.

1 designates a tubular hub of a clutch of the "Chevrolet" type. The hub 1 is slidable on a central longitudinal rod 2, which extends through the closed inner end of the hub 1, and which has at its inner end a head 3 which bears against balls 4, which rest in a ball race provided in a plate 5 which is mounted in a fly wheel 6 against which is adapted to bear a clutch member 7, only a portion of which is shown.

In the hub 1 is a coil spring 8, which encircles the rod 2 and which has its inner end bearing against the closed end of the hub 1, the other end bearing against a washer 9, which rests against the pin 10 mounted in a transverse hole in the rod 2, and adapted to be inserted into or removed from the rod through either of two holes 11 disposed diametrically opposite to each other in the hub 1. Normally the pin 10 is in register with the holes 11. The hub 1 is slidable in the hub of the fly wheel 6 and is normally forced toward the wheel, so as to engage the clutch member 7 therewith, by the spring 8.

The clutch which has just been described is one in common use. For relieving the pin 10 from the pressure of the spring 8, so that the pin 10 can be removed from the rod 2, in disassembling the clutch, or for compressing the spring 8 to a point at which the pin 10 can be easily inserted in the rod 2, I have provided the following described mechanism.

12 designates a supporting member adapted to be mounted removably on the hub 1, and comprising, preferably, a U shaped yoke adapted to embrace the hub 1 between two annular peripheral flanges 13 and 14 with which the hub 1 is provided. The holes 11 are disposed between the flanges 13 and 14, and one edge of the yoke 12 is provided with a notch 15 adapted to register with the holes 11. Carried by the yoke 12 is a support comprising, preferably, two parallel longitudinal bars 16, respectively secured at one set of ends to two diametrically opposite lugs 17 on the periphery of the yoke 12. The other ends of the bars 16 are threaded, each bar having thereon two nuts 18 between which is clamped a plate 19 having a screw threaded hole extending centrally therethrough.

Fitted slidably on the bars 16 is a transverse clamping member 20 having a central tubular extension 21 adapted to enter the hub 1 and to have its inner end engage the washer 9 so as to slide the latter inwardly on the rod 2, thereby compressing the spring 8 so as to relieve the pin 10 from the pressure of the spring, or to force the spring to a position in which the pin 10 can be easily inserted into the rod 2. The inner end of the extension 21 has two notches 22 adapted to receive the pin 10.

Means are provided for forcing the member 20 to the operative position. Such means comprises, preferably, a screw 23 fitted in the threaded central hole in the plate 19 and bearing at its inner end against the member 20. The other end of the screw 23 is provided with a handle 24.

Means may be provided for normally forcing the member 20 to the inoperative position, shown in Fig. 1, when the screw 23 has been adjusted to the position shown in Fig. 1. Such means comprise, preferably, two coil springs 25 respectively encircling the bars 16, the outer ends of the springs bearing against the member 20, and the inner ends of the springs bearing respectively against the lugs 17 of the yoke 12.

In the operation of my invention, the yoke 12 is slipped on the hub 1 between the flanges 13 and 14 and with the notch 15 disposed so as to register with the holes 11. The screw 23 is then turned so as to force the member 20 to a position in which the extension 21 will enter the hub 1 and engage and force the washer 9, against the pressure of the spring 8, to a position in which the washer will not bear on the pin 10. The notches 22 of the extension will now register with the holes 11 and will receive the pin 10. The pin 10 can now be easily punched out of the rod 2 through either of the holes 11, the punch, not shown, which is used for removing the pin 10 being inserted through the other hole 11.

After the pin 10 has been removed, the screw 23 is retracted, and the springs 25 will force the member 20 out of the hub 1. The yoke 12 may then be slipped off from the hub 1, after which the clutch may be readily disassembled.

In assembling the clutch parts, after the spring 8 and washer 9 have been mounted on the rod 2, the yoke 12 is again mounted on the hub between the flanges 13 and 14, and the screw 23 is turned so as to force the member 20 to a position in the hub 1 that the spring 8 will be compressed so that the washer 9 will be at the inner side of the hole in the rod 2 which receives the pin 10. The latter may then be inserted in the rod 2, after which the screw 23 is retracted to a position in which the spring pressure will bear against the pin 10 and the extension will be clear of the hub 1. The tool may then be removed from the hub.

I do not limit my invention to the structure shown and described, as many modifications, within the scope of the appended claims, may be made without departing from the spirit of my invention.

What I claim is:—

1. In a clutch spring compressor adapted for use on a clutch having a tubular hub, a rod on which the hub is slidable, a pin carried by the rod, and a spring supported by the pin and carried in and bearing against the hub, the combination with a supporting member adapted to be mounted on and supported by the hub, of a guide carried by said supporting member, a plate carried by said guide and having a screwthreaded hole, a member slidable on said guide adapted to be moved to and from a position in which it will compress said spring so as to relieve said pin from the spring pressure, and a screw fitted in said threaded hole and arranged to engage said slidable member for forcing the latter to the operative position.

2. In a clutch spring compressor adapted for use on a clutch having a tubular hub, a rod on which the hub is slidable, a pin carried by the rod and a spring supported by the pin and carried in and bearing against the hub, the combination with a supporting member adapted to be mounted on and supported by the hub, of a guide carried by said supporting member, a plate carried by said guide and having a screwthreaded hole, a member slidable on said guide to and from a position in which it will compress said spring to relieve said pin from the spring pressure, a screw fitted in said threaded hole and arranged to engage said slidable member for forcing the latter to the operative position and yielding means for normally forcing said slidable member from the operative position.

3. In a clutch spring compressor adapted for use on a clutch having a tubular hub, a rod on which the hub is slidable, a pin carried by the rod, and a spring supported by the pin and carried in the hub, the combination with a supporting member adapted to be mounted on and supported by the hub, of a guide carried by said supporting member, a plate carried by said guide, a member slidable on said guide to and from a position in which it will engage and compress said spring so as to relieve the pin from the spring pressure, and means carried by said plate for forcing the slidable member to the operative position.

4. In a clutch spring compressor of the kind described, the combination with a yoke adapted to embrace and be supported by the hub of a clutch, of two bars carried by said yoke, a plate having a screwthreaded hole and supported by said yoke, a spring compressing member slidable on said bars to and from a position it will engage and compress a spring mounted in said hub, and a screw fitted in said threaded hole and arranged to engage and force said slidable member to the operative position.

5. In a clutch spring compressor, in combination with a rod, a hub slidable thereon having two oppositely disposed holes, a pin carried removably in said rod and insertible and removable through said holes, and a spring in said hub bearing against the pin and hub, of a supporting member mounted on said hub and having a notch registering with said holes, two bars carried by said supporting member, a plate carried by said bars and having a screw threaded hole, a member slidable on said bars to and from a position in which it will engage and force the spring from said pin so that the latter may be withdrawn from said rod through said holes and notch, and a screw fitted in said threaded hole and arranged to engage and force said slidable member to said position.

6. In a clutch spring compressor, in combination with a rod, a hub slidable thereon having two oppositely disposed holes, a pin carried removably in said rod, and a spring in said hub bearing against said pin and said hub, of a yoke mounted on and supported by said hub and having a notch adapted to register with said holes, two bars carried by said yoke, a plate carried by said bars, a member slidable on said bars and having an extension adapted to enter said hub and to engage and compress said spring so as to relieve said pin from the spring pressure, said extension having a notch adapted to register with the other notch and said holes, the pin being normally in register with said holes, and means carried by said plate for engaging and forcing said slidable member to the operative position, substantially as set forth.

7. In a clutch spring compressor, in combination with a rod, a hub slidable on the rod having two oppositely disposed holes, a pin removably mounted in said rod and normally in register with said holes, and a spring in said hub bearing on the pin and said hub, of a supporting member removably mounted on and supported by said hub, two bars carried by said supporting member, a plate carried by said bars, a member slidable on said bars and having an extension adapted to enter said hub and to engage and compress said spring away from said pin, the extension having a notch adapted to register with said holes, and means for forcing said slidable member into the operative position.

8. In a clutch spring compressor, in combination with a rod, a hub slidable thereon and having two oppositely disposed holes, a pin removably mounted in said rod and normally registering with said holes, and a spring in said hub bearing against said pin and said hub, of a member mounted on said hub, a bar carried by said member, a plate carried by said bar, a member slidable on said bar and having an extension adapted to enter said hub and to engage and force said spring from said pin, and means carried by said plate for engaging and forcing said slidable member to the operative position.

9. In a clutch spring compressor, in combination with a rod, a hub slidable thereon having two oppositely disposed holes, a pin removably mounted in said rod and normally in register with said holes, and a spring in said hub bearing against said pin and said hub, of a yoke embracing and supported by said hub, two bars carried by said yoke, a plate carried by said bars, a member slidable on said bars and adapted to engage and force said spring from said pin, and a screw carried by said plate and arranged to engage and force said slidable member to the operative position, substantially as set forth.

10. In a clutch spring compressor in combination with a rod, a hub slidable thereon having two oppositely disposed holes, a pin removably mounted in said rod and normally in register with said holes, and a spring bearing against said pin and said hub, of a yoke embracing and supported by said hub, the yoke having a notch registering with said holes, a support carried by said yoke, a member slidable on said support and having an extension adapted to engage and force said spring from said pin, said extension having a notch adapted to register with said holes, and means carried by said support for forcing said slidable member to the operative position, substantially as set forth.

In testimony whereof I have signed my name to this specification.

HERMAN C. HUNN.